United States Patent
Kurosawa et al.

(10) Patent No.: US 6,891,654 B2
(45) Date of Patent: May 10, 2005

(54) LIGHT MODULATOR AND METHOD OF MANUFACTURING THE SAME

(75) Inventors: Ryuichi Kurosawa, Okaya (JP); Shinichi Kamisuki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/171,620

(22) Filed: Jun. 17, 2002

(65) Prior Publication Data

US 2003/0161027 A1 Aug. 28, 2003

(30) Foreign Application Priority Data

Jun. 26, 2001 (JP) ........................................ 2001-193379

(51) Int. Cl.⁷ .............................................. G02B 26/00
(52) U.S. Cl. ...................... 359/291; 359/292; 359/295; 359/290; 359/298
(58) Field of Search ................................ 359/291, 292, 359/295, 298, 290, 293, 223, 224, 280, 281, 282, 214, 236

(56) References Cited

U.S. PATENT DOCUMENTS

| | | | | |
|---|---|---|---|---|
| 653,880 A | * | 7/1900 | Huibers | 454/98 |
| 5,991,066 A | * | 11/1999 | Robinson et al. | 359/293 |
| 6,107,115 A | * | 8/2000 | Atobe et al. | 438/72 |
| 6,538,799 B2 | * | 3/2003 | McClelland et al. | 359/291 |
| 6,538,800 B2 | * | 3/2003 | Huibers | 359/291 |
| 6,563,106 B1 | * | 5/2003 | Bowers et al. | 250/216 |
| 2002/0132389 A1 | * | 9/2002 | Patel et al. | 438/97 |
| 2002/0196524 A1 | * | 12/2002 | Huibers et al. | 359/291 |
| 2004/0012838 A1 | * | 1/2004 | Huibers | 359/291 |
| 2004/0035821 A1 | * | 2/2004 | Doan et al. | 216/2 |

FOREIGN PATENT DOCUMENTS

| | | |
|---|---|---|
| JP | 4-230722 | 8/1992 |
| JP | 5-188308 | 7/1993 |
| JP | 5-196880 | 8/1993 |

* cited by examiner

*Primary Examiner*—Ricky Mack
*Assistant Examiner*—Brandi Thomas
(74) *Attorney, Agent, or Firm*—Oliff & Berridge, PLC

(57) ABSTRACT

A method of manufacturing a light modulator in which micromirrors are tilted by an electrostatic force generated by an electrical potential difference between drive electrodes and the micromirrors. The method includes integrally forming support sections disposed at fulcrum points for tilting the micromirrors and axis portions forming axes for tilting the micromirrors.

15 Claims, 14 Drawing Sheets

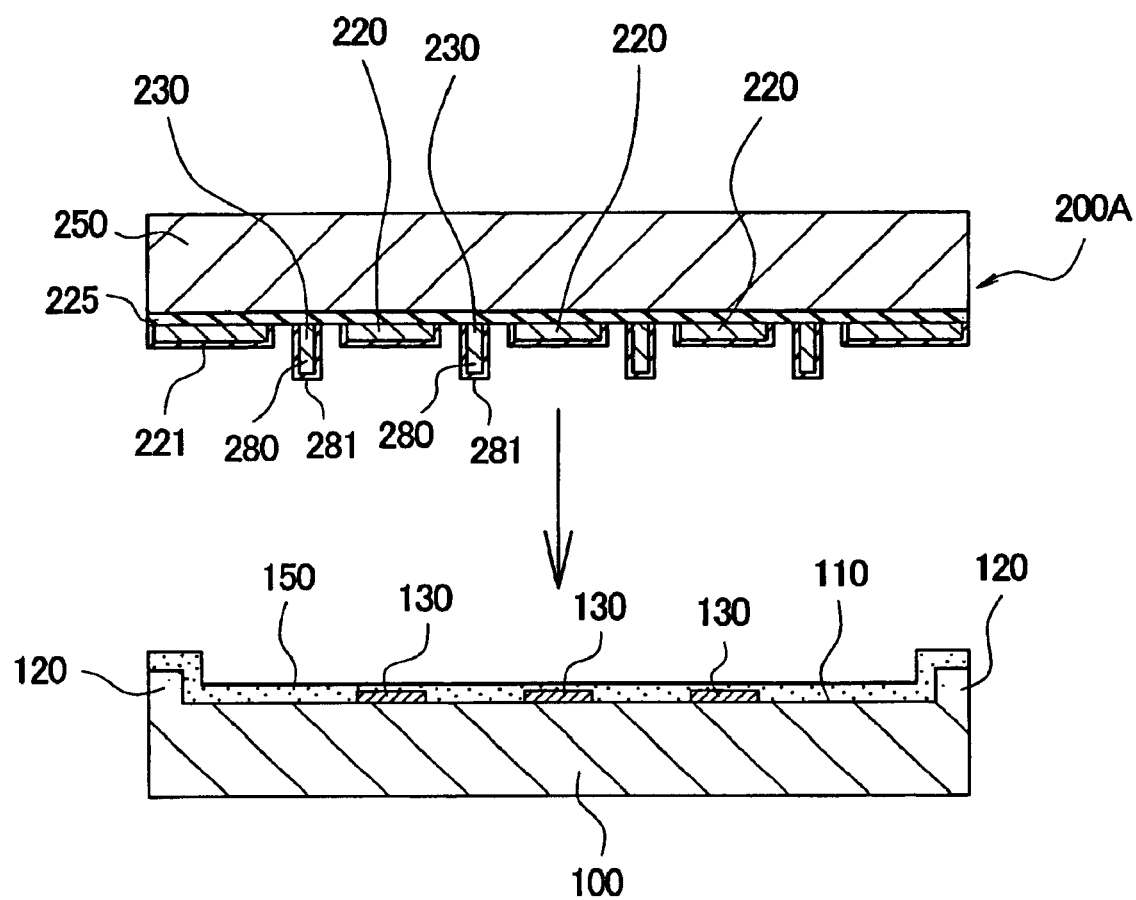

LIGHT MODULATOR AND METHOD OF MANUFACTURING THE SAME

Japanese Patent Application No. 2001-193379, filed on Jun. 26, 2001, is hereby incorporated by reference in its entirety.

BACKGROUND OF THE INVENTION

The present invention relates to a light modulator and method of manufacture thereof.

In a light modulator, by means of the electrostatic force generated by an electrical potential difference between a micromirror and a drive electrode, the micromirror is tilted, and by means of this light from a light source is modulated. As a light modulator is known, for example, a DMD (Digital Micromirror Device) constituted by a large number of micromirrors disposed in a matrix. By means of a DMD, a large screen with high resolution and high intensity can be provided. For this reason, a DMD is used for a projected image device such as a projector or the like.

A light modulator has a laminated construction comprising a mirror substrate having micromirrors, and an electrode substrate having drive electrodes. The micromirror is driven to tilt about a support (post) provided between the mirror substrate and electrode substrate as fulcrum. The support is fixed to an axis portion (torsion bar) of the mirror substrate when the axis portion couples a plurality of micromirrors together and acts as the axis for tilting.

Since the micromirror is driven to twist between the support and axis portion, stress is concentrated on the boundary of the support and axis portion. Conventionally, since the support and axis portion were formed separately, and subsequently fixed together by an adhesive or the like, when the micromirror was driven to tilt the stress was concentrated, and the boundary was subject to fracture.

BRIEF SUMMARY OF THE INVENTION

According to a first aspect of the present invention, there is provided a method of manufacturing a light modulator in which micromirrors are tilted by an electrostatic force generated by an electrical potential difference between drive electrodes and the micromirrors, wherein support sections disposed at fulcrum points for tilting the micromirrors and axis portions which form axes for tilting the micromirrors are integrally formed.

A light modulator according to a second aspect of the present invention is manufactured by the above described method.

According to a third aspect of the present invention, there is provided a light modulator comprising:

a mirror substrate including a plurality of micromirrors; and an electrode substrate including a plurality of drive electrodes which tilts the micromirrors using an electrostatic force generated by an electrical potential difference between the drive electrodes and the micromirrors, the electrode substrate being bonded to the mirror substrate so that the drive electrodes and the micromirrors are opposed, wherein support sections disposed at fulcrum points for tilting the micromirrors and axis portions forming axes for tilting the micromirrors are integrally formed on the mirror substrate.

BRIEF DESCRIPTION OF THE SEVERAL VIEWS OF THE DRAWING

FIG. 8 shows the method of manufacturing a light modulator according to the first embodiment of the present invention.

DETAILED DESCRIPTION OF THE EMBODIMENTS

Figure 1:
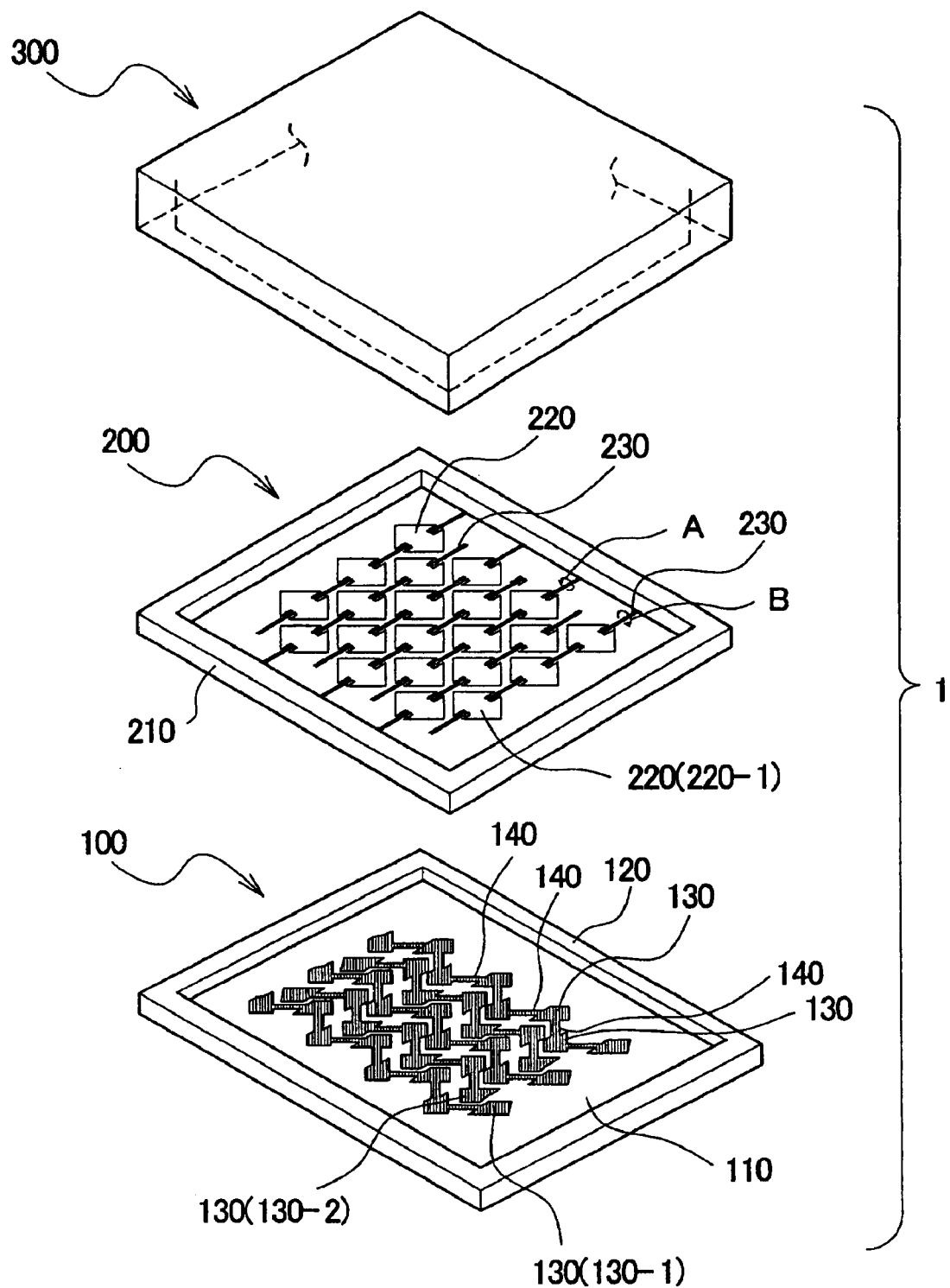
FIG. 1 shows a light modulator according to a first embodiment of the present invention.

The present invention may provide a light modulator of excellent durability and method of manufacturing the light modulator.

(1) According to one embodiment of the present invention, there is provided a method of manufacturing a light modulator in which micromirrors are tilted by an electrostatic force generated by an electrical potential difference between drive electrodes and the micromirrors, wherein support sections disposed at fulcrum points for tilting the micromirrors and axis portions which form axes for tilting the micromirrors are integrally formed.

Since the support sections and axis portions are formed integrally, the mechanical strength of their boundary can be increased. The boundary is therefore less susceptible to breakage when the micromirrors are driven to tilt and twisted. Therefore, a light modulator of excellent durability can be fabricated.

(2) In this method of manufacturing a light modulator, a first substrate including the drive electrodes may be bonded to a second substrate which includes: a first layer on which the micromirrors, the support sections and the axis portions are formed; a second layer forming a base of the first layer; and a third layer provided between the first and second layers and acting as a stopping layer when the second layer is removed.

This makes it possible to form the support sections and axis portions integrally by patterning the first layer.

(3) In this method of manufacturing a light modulator, end portions of the support sections of the second substrate may be bonded to the first substrate, after the formation of the support sections.

(4) In this method of manufacturing a light modulator, the end portions of the support sections of the second substrate may be bonded to the first substrate with an adhesive interposed.

By interposition of the adhesive, the first and second substrates can be easily bonded.

(5) In this method of manufacturing a light modulator, the adhesive may be provided on the first substrate.

Since the support sections are not formed on the first substrate, the adhesive can be provided uniformly on the surface.

(6) In this method of manufacturing a light modulator, the second layer may be removed using the third layer as a stopping layer after the bonding of the first and second substrates.

The third layer can be used as a stopping layer for removing the second layer. Therefore, when removing the second layer, the first layer on which the support sections are formed can be rendered less susceptible to damage.

(7) In this method of manufacturing a light modulator, the micromirrors and the support sections may be formed after the removal of the second layer.

(8) In this method of manufacturing a light modulator, the micromirrors and the support sections may be formed before the bonding of the first and second substrates.

In other words, the first and second substrates may be bonded after the formation of the micromirrors, support sections and axis portions. Therefore, even if any of the micromirrors, support sections and axis portions are defective, only the second substrate has to be discarded. Therefore, costs can be reduced.

(9) A light modulator according to one embodiment of the present invention, is manufactured by the above described method.

(10) According to one embodiment of the present invention, there is provided a light modulator comprising:

a mirror substrate including a plurality of micromirrors; and an electrode substrate including a plurality of drive electrodes which tilts the micromirrors using an electrostatic force generated by an electrical potential difference between the drive electrodes and the micromirrors, the electrode substrate being bonded to the mirror substrate so that the drive electrodes and the micromirrors are opposed, wherein support sections disposed at fulcrum points for tilting the micromirrors and axis portions forming axes for tilting the micromirrors are integrally formed on the mirror substrate.

According to this embodiment of the invention, since the support sections and axis portions are formed integrally, the mechanical strength of their boundary can be increased. The boundary is therefore less susceptible to breakage when the micromirrors are driven to tilt and twisted. Therefore, a light modulator of excellent durability can be provided.

(11) In this light modulator, the support sections and the axis portions may be formed of a silicon monocrystalline layer.

This makes it possible to form the support sections and axis portions integrally from the silicon monocrystalline layer.

(12) In this light modulator, the mirror substrate may be bonded to the electrode substrate with an adhesive interposed.

Some embodiments of the present invention will be described below with reference to the drawings. However, the present invention is not limited to these embodiments.

1. First Embodiment

FIG. 1 to FIG. 10 show a light modulator and method of manufacture thereof according to a first embodiment of the present invention.

1.1 Structure of the Light Modulator

FIG. 1 is an exploded perspective view of the light modulator of this embodiment. A light modulator 1 includes an electrode substrate 100, a mirror substrate 200, and a cover glass substrate 300. The light modulator 1 is formed by laminating the electrode substrate 100, mirror substrate 200, and cover glass substrate 300 in that order.

The material of the mirror substrate 200 is, for example, monocrystalline silicon. The mirror substrate 200 includes a plurality of micromirrors 220 disposed in a matrix within a frame 210. It should be noted that the layout of the micromirrors 220 is not restricted to a matrix, and according to the application of the light modulator 1, maybe any layout, such as, for example, a single line.

Figure 2:
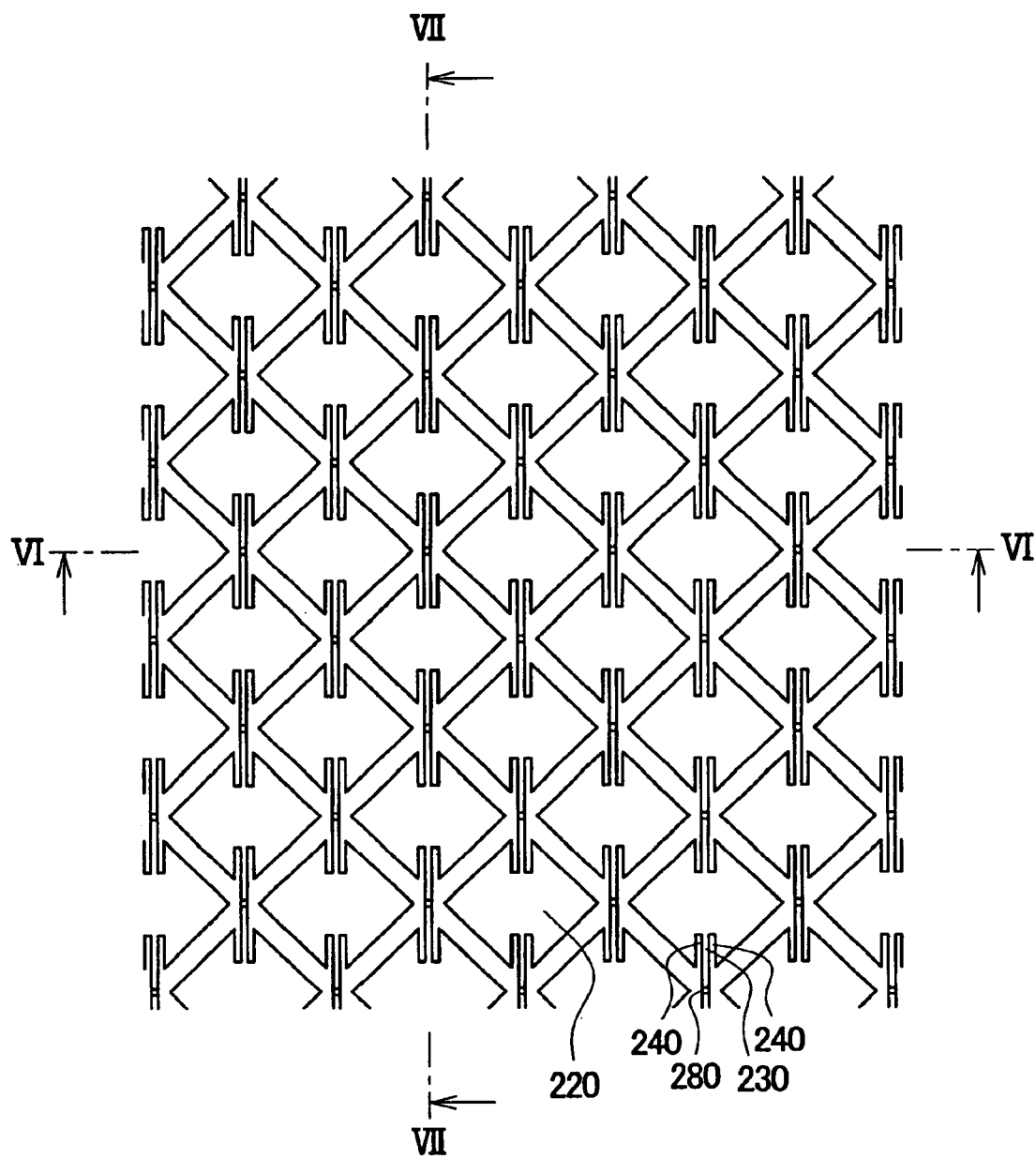
FIG. 2 shows a part of the light modulator according to the first embodiment of the present invention.

The plan form of a micromirror 220 is, for example, a square of side 15 µm. When the light modulator 1 is used in a projected image device such as a projector or the like, each micromirror 220 functions as a single pixel. In one direction, the micromirrors 220 are coupled together by axis portions 230. The axis portion 230 functions as a pivot when the micromirror 220 is tilted. In other words, the micromirror 220 is twisted in the directions shown by the arrows A and B with the axis portion 230 as the pivot. By means of this, the micromirror 220 can be tilted in each of the directions indicated by the arrows A and B through, for example, about 10 degrees. FIG. 2 shows a part of the plurality of micromirrors 220 disposed in a matrix shown in FIG. 1. The micromirror 220 has a slit 240 formed on both sides of the portion connecting to the axis portion 230. By means of the slit 240, the micromirror 220 can be easily driven to tilt.

On the mirror substrate 200 a support 280 is formed, connected to the axis portion 230 (see FIG. 2). The support 280 is positioned at the fulcrum points when the micromirror 220 is tilted. The support 280 projects from the surface of the mirror substrate 200 in the direction of the electrode substrate 100, and is supported by the electrode substrate 100. Each support 280 is provided in an intermediate position in the direction of extension of one of the axis portions 230.

The support 280 is formed integrally with the axis portion 230. That is to say, the axis portion 230 and support 280 constitute a single mechanical member. The micromirror 220 is also formed to constitute single mechanical member together with the axis portion 230 and support 280. For example, the micromirror 220, axis portion 230, and support 280 are formed by patterning of a silicon monocrystalline layer.

The material of the electrode substrate 100 may be, for example, silicon. For example, as the electrode substrate 100 may be used a silicon substrate on which is formed a semiconductor element. Alternatively, the electrode substrate 100 may be for example a glass substrate or the like, formed of a material other than silicon.

The electrode substrate 100 has a recessed region 110 and a side wall 120 positioned around the four sides thereof. In the recessed region 110, a plurality of drive electrodes 130 are formed in a matrix. The drive electrodes 130 are positioned to oppose the rear surface of the micromirrors 220, and are the electrodes for tilting the micromirrors 220. Two drive electrodes 130 act as electrodes to drive a single micromirror 220. For example, to describe the case of the micromirror 220-1, drive electrodes 130-1 and 130-2 are the electrodes that drive the micromirror 220-1.

In the plurality of drive electrodes 130, drive electrodes 130 aligned in the direction substantially perpendicular to the direction of extension of the axis portions 230 are electrically connected in common by interconnecting lines 140. The interconnecting lines 140 are formed by patterning of a conducting layer at the same time as the drive electrodes 130.

The mirror substrate 200 is bonded to the electrode substrate 100. In more detail, supports 280 of the mirror substrate 200 (see FIG. 2) are bonded to the electrode substrate 100. The method of bonding may be, for example, a method of adhering by interposition of an adhesive, or a bonding method such as anodic bonding or the like. Moreover, the side wall 120 of the electrode substrate 100 is bonded to the frame 210 of the mirror substrate 200. On the opposite side of the frame 210 of the mirror substrate 200 from the electrode substrate 100, the cover glass substrate 300 is bonded.

1.2 Principle of Tilting the Micromirror

Figure 3:
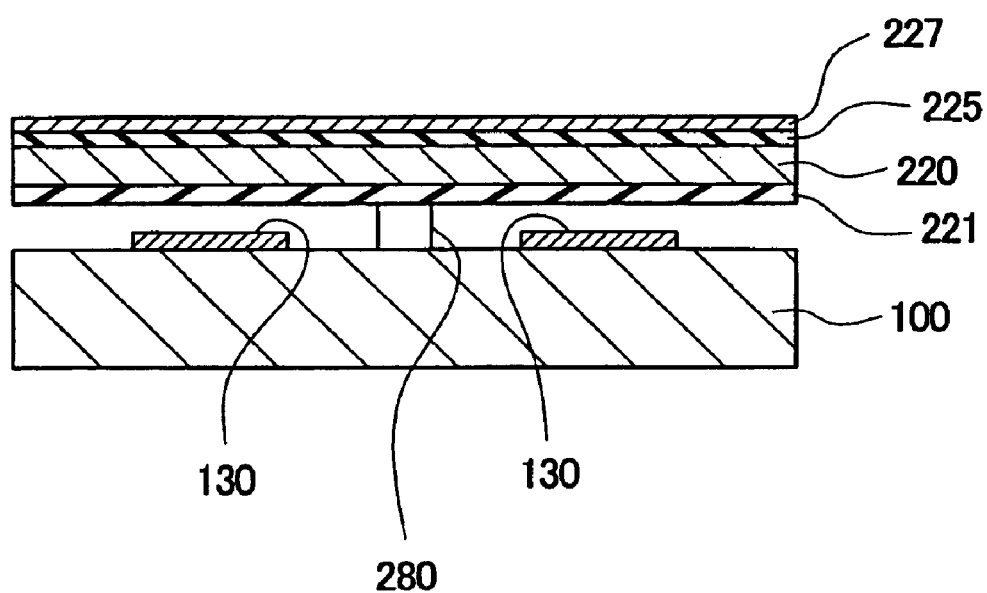
FIG. 3 shows a part of the light modulator according to the first embodiment of the present invention.

Next, the principle of tilting the micromirror 220 is described. FIG. 3 is an enlarged sectional view of a part of the light modulator 1. On the surface of the micromirror 220, a reflecting layer 227 is formed with a silicon oxide layer 225 interposed, and on the rear surface of the micromirror 220, an insulating layer 221 is formed. The micromirror 220 is supported from the electrode substrate 100 by the support 280 connected to the axis portion 230. The support 280 and electrode substrate 100 are bonded by for example adhesive (not shown in the drawings).

The micromirror 220, as described below, is fabricated using an SOI (Silicon On Insulator) substrate. A silicon monocrystalline layer of the SOI substrate forms the micromirror 220, and a silicon oxide layer of the SOI substrate forms the silicon oxide layer 225. The reflecting layer 227 need only have the property of reflecting light, and as this material may be cited, for example, aluminum, gold, and silver. The insulating layer 221 functions to prevent the micromirror 220 and drive electrodes 130 from being short-circuited. In place of forming the insulating layer 221 on the micromirror 220, an insulating layer may be formed on the surface of the drive electrodes 130. In this case, the adhesive (insulating adhesive) bonding the electrode substrate 100 and mirror substrate 200 may serve to prevent short-circuiting between the drive electrodes 130 and the micromirror 220. As the insulating layer 221 may be cited, for example, a silicon oxide layer or silicon nitride layer by the method using TEOS (Tetraethylorthosilicate) or the method of thermal oxidation. If the problem of short-circuiting of the micromirror 220 and drive electrodes 130 does not occur, the insulating layer 221 is not required.

It should be noted that since the micromirror 220 is a silicon monocrystalline layer, it can also function as the reflecting layer. Therefore, when the micromirror 220 itself is reflecting light, the reflecting layer 227 is not required. Since the silicon oxide layer 225 is transparent, it need not be removed, but may be removed according to the characteristics required of the micromirror 220.

Figure 4A:
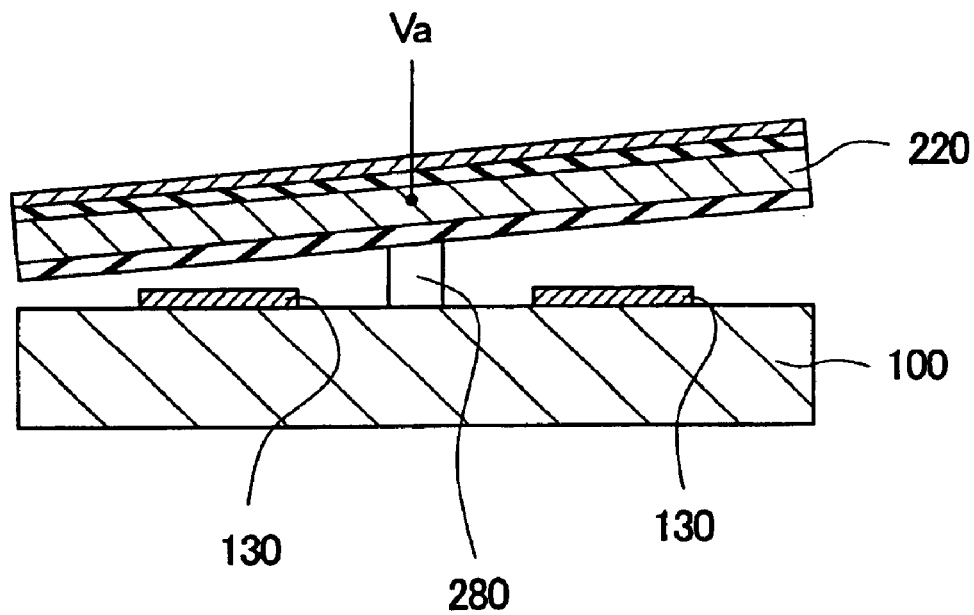
FIGS. 4A and 4B show a part of the light modulator according to the first embodiment of the present invention.
Figure 4B:
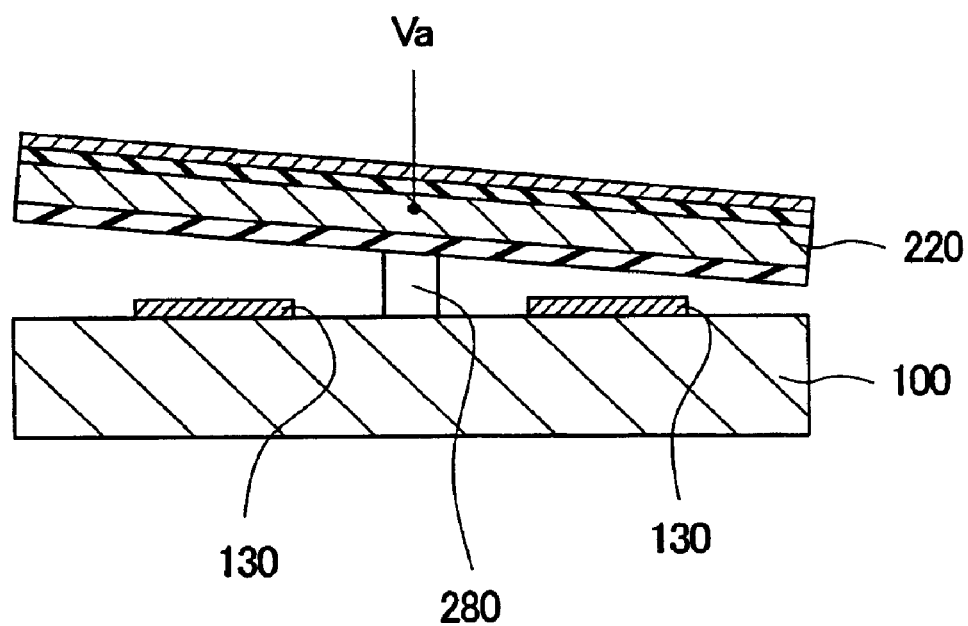

FIGS. 4A and 4B are sectional views of the micromirror 220 shown in FIG. 3, in the tilted state. With a bias voltage Va is applied to the micromirror 220, for example, a positive voltage is applied to one of the drive electrodes 130, and a negative voltage is applied to the other drive electrode 130. By means of this, a repelling electrostatic force acts between on end of the micromirror 220 and one of the drive electrodes 130, and an attracting electrostatic force acts between the other end of the micromirror 220 and the other drive electrode 130, thus driving to tilt the micromirror 220 as shown in FIG. 4A. This is the "ON" state in which light is reflected toward a particular position. In contrast, by reversing the polarity of the voltages applied to the two drive electrodes 130, the micromirror 220 is driven to tilt as shown in FIG. 4B. This is the "OFF" state, in which the light is reflected in a direction other than that of the particular position. In this embodiment, by varying the switching times of the "ON" state and "OFF" state, for example, a 256 gray-level display is possible.

1.3 Method of Manufacturing the Light Modulator

The light modulator of this embodiment is fabricated by forming the electrode substrate (first substrate) 100 and second substrate (substrate for forming the mirror substrate 200) 200A, and bonding these together. This fabrication may use, for example, silicon micromachining technology.

First, the fabrication of the electrode substrate (first substrate) 100 is described. FIGS. 5A to 5D illustrate this process.

Figure 5A:
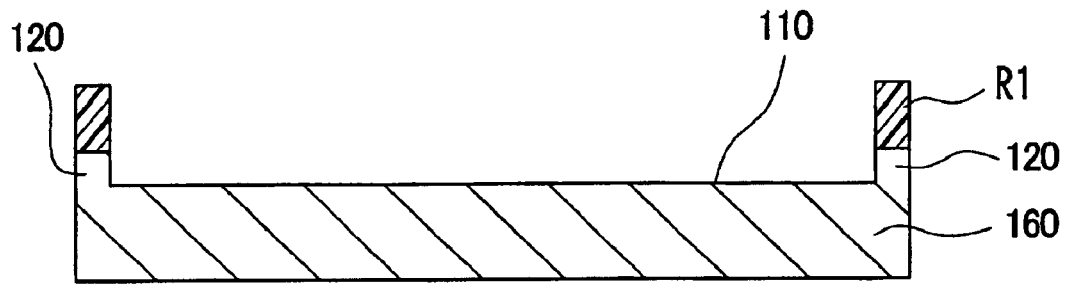
FIGS. 5A to 5D show a method of manufacturing a light modulator according to the first embodiment of the present invention.

As shown in FIG. 5A, a silicon substrate 160 to form the base of the electrode substrate 100 is provided. The silicon substrate 160 may have formed a semiconductor element not shown in the drawings. Alternatively, as the substrate to form the base of the electrode substrate 100, a glass substrate may be provided.

On the silicon substrate 160, a resist R1 is applied, then by photolithography the resist R1 is given a predetermined pattern. With the resist R1 as a mask, the silicon substrate 160 is subjected to dry etching, for example by CF4 gas. The part of the silicon substrate 160 masked by the resist R1 forms the side wall 120. The height of the side wall 120, or in other words the depth of the recessed region 110 is, for example, 2 $\mu$m.

Figure 5B:
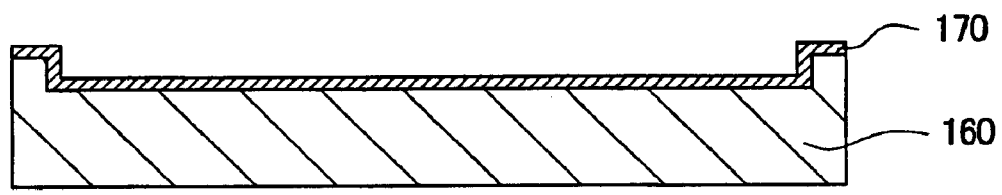

As shown in FIG. 5B, on the whole surface of the silicon substrate 160, a conducting layer 170 to become the drive electrodes is formed. The thickness of the conducting layer 170 is, for example, from 0.1 $\mu$m to 0.2 $\mu$m. The conducting layer 170 may be formed from a transparent conducting material such as, for example, ITO (Indium Tin Oxide), or from gold or chromium. The conducting layer 170 can be formed by vapor deposition, by sputtering, or by ion plating.

Figure 5C:
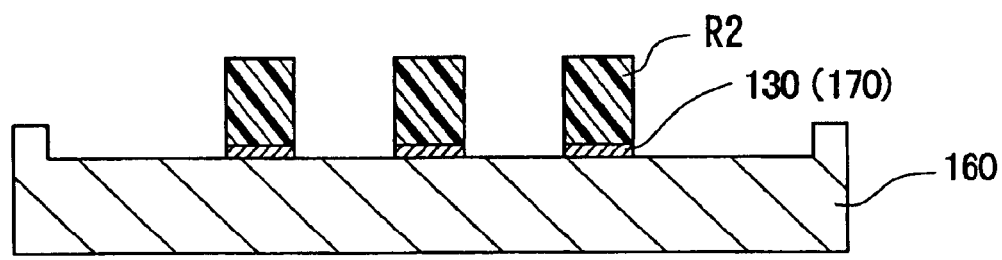

As shown in FIG. 5C, the resist R2 is applied on the conducting layer 170, and by photolithography the resist R2 is patterned in a predetermined manner. With the resist R2 as a mask, the conducting layer 170 is subjected to, for example, dry etching, whereby the conducting layer 170 is patterned. By means of this, the drive electrodes 130 are formed. The patterning of the conducting layer 170 can also be carried out by wet etching.

Figure 5D:
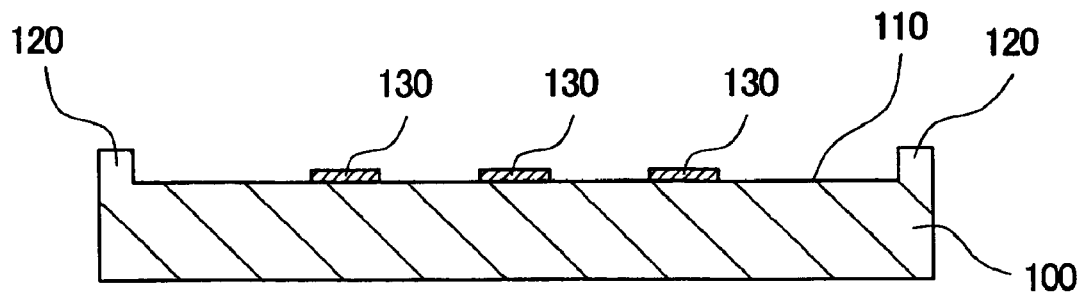

As shown in FIG. 5D, by removing the resist R2 from on the drive electrodes 130, the electrode substrate (first substrate) 100 is completed. It should be noted that the surface of the electrode substrate (first substrate) 100 on which the drive electrodes 130 are formed is the surface to be adhered to the second substrate 200A described below.

Next, the fabrication of the second substrate 200A to form the mirror substrate 200 as shown in FIGS. 6A to 7D is described. FIGS. 6A to 6D are sectional views in the same orientation as the section taken along the line VI—VI of FIG. 2. FIGS. 7A to 7D are sectional views in the same orientation as the section take along the line VII—VII of FIG. 2.

Figure 6A:
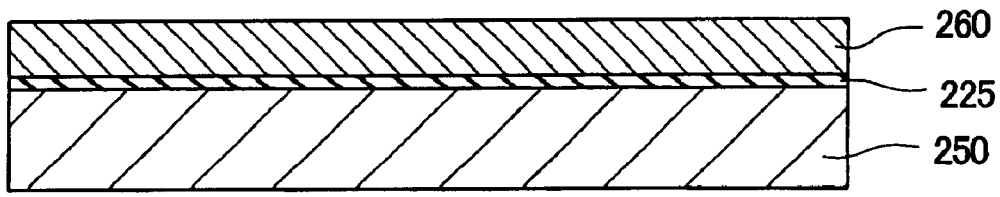
FIGS. 6A to 6D show the method of manufacturing a light modulator according to the first embodiment of the present invention.
Figure 7A:
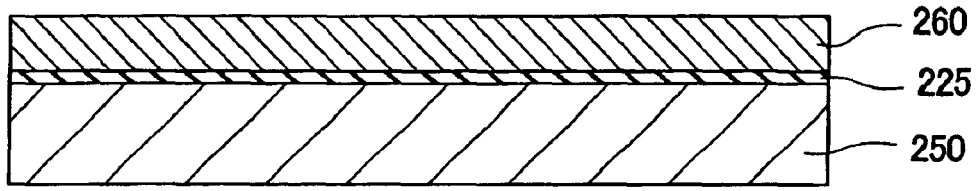
FIGS. 7A to 7D show the method of manufacturing a light modulator according to the first embodiment of the present invention.

As shown in FIGS. 6A and 7A, an SOI substrate has a silicon substrate 250, the silicon oxide layer 225, and a silicon monocrystalline layer 260 laminated in this sequence. From the silicon monocrystalline layer (first layer) 260, the micromirrors 220, axis portions 230 and supports 280 are formed. The silicon substrate (second layer) 250 forms the base of the silicon monocrystalline layer 260. Since the silicon monocrystalline layer 260 is extremely thin, a base layer is required. The silicon oxide layer (third layer) 225 forms a stopping layer when the silicon substrate 250 is removed.

The thickness of the silicon monocrystalline layer 260 is determined in consideration of the thickness of the micromirrors 220 and axis portions 230 and the height of the supports 280, and is, for example, 2 μm to 4 μm. It should be noted that the thickness of the silicon substrate 250 is, for example, 525 μm to 600 μm. The thickness of the silicon oxide layer 225 is, for example, 0.1 μm to 0.5 μm. It should be noted that in place of the SOI substrate, an SOS (Silicon On Sapphire) substrate can also be used.

Figure 6B:
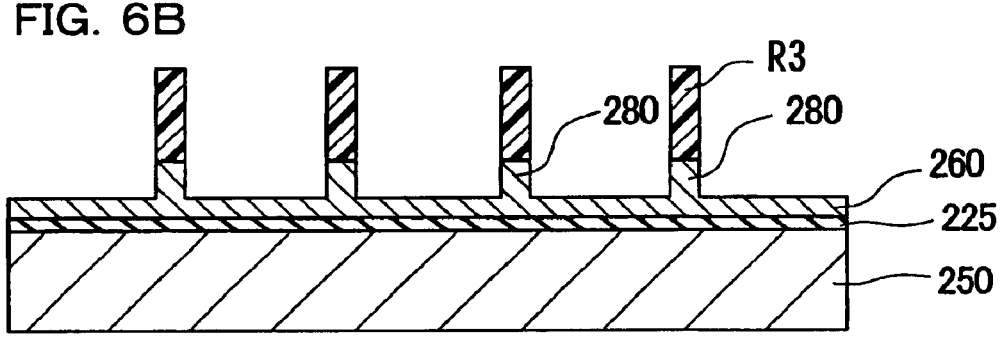
Figure 7B:
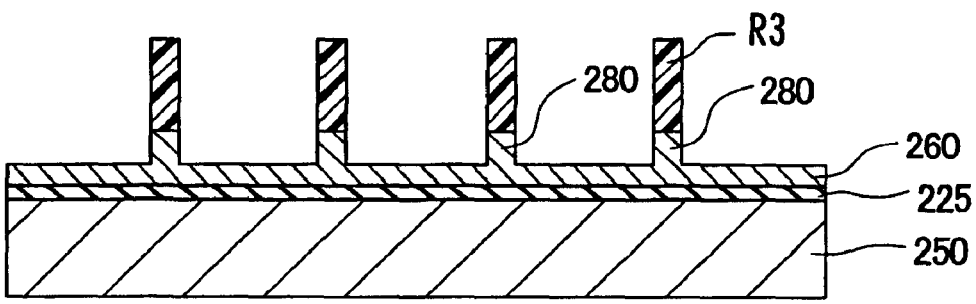

As shown in FIGS. 6B and 7B, the resist R3 is applied on the silicon monocrystalline layer 260, and the resist R3 is patterned in a predetermined manner by means of photolithography. With the resist R3 as a mask, using for example anisotropic dry etching, the upper part of the silicon monocrystalline layer 260 is patterned, whereby the supports 280 are formed. The supports 280 are positioned at the fulcrum when the micromirrors 220 are tilted.

Figure 6C:
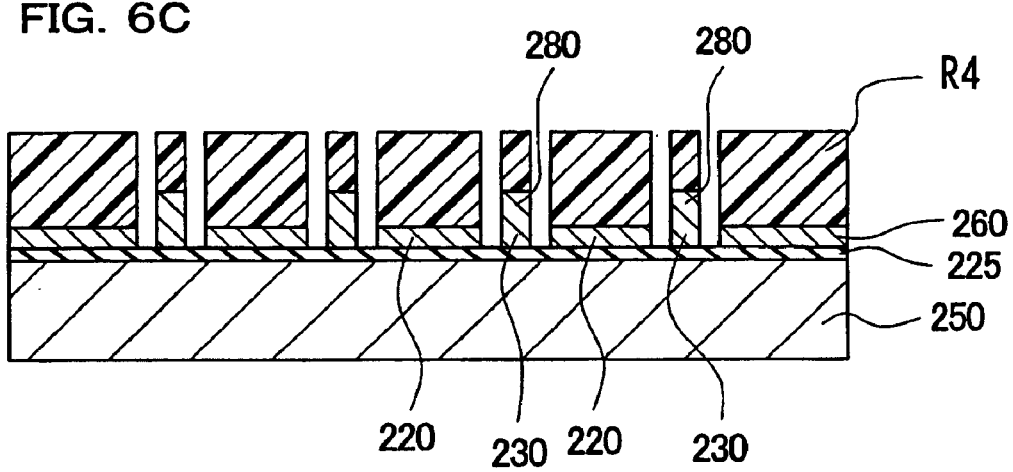
Figure 7C:
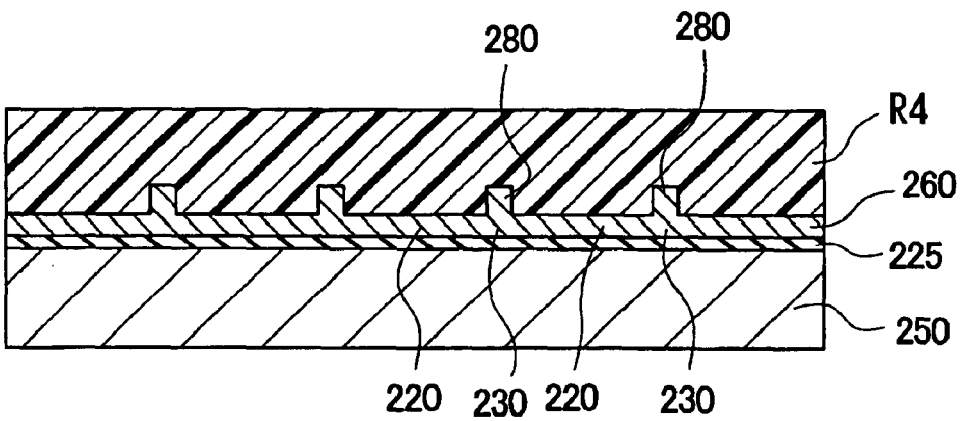

As shown in FIGS. 6C and 7C, the resist R4 is applied so as to cover the silicon monocrystalline layer 260, and the resist R4 is patterned in a predetermined manner by means of photolithography. With the resist R4 as a mask, using, for example, anisotropic dry etching, the lower part of the silicon monocrystalline layer 260 is patterned, whereby the micromirrors 220 and axis portions 230 are formed. In this way, the micromirrors 220, axis portions 230, and supports 280 can be formed integrally. Thereafter, the resist R4 is removed.

Figure 6D:
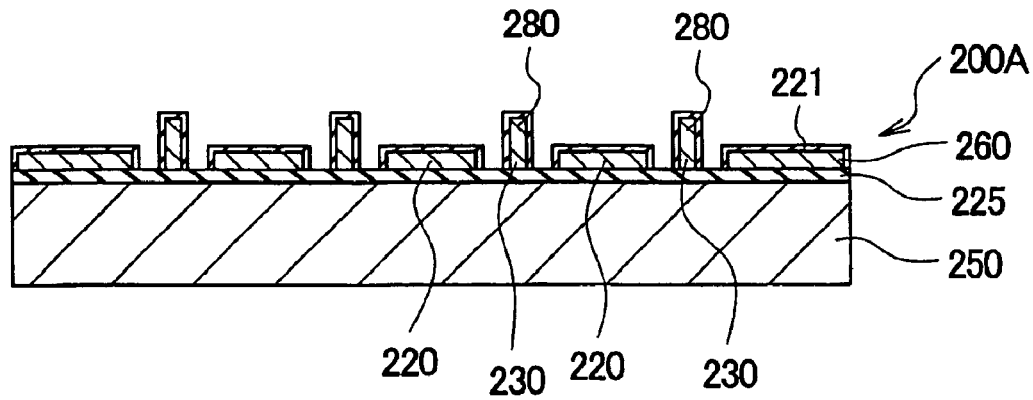
Figure 7D:
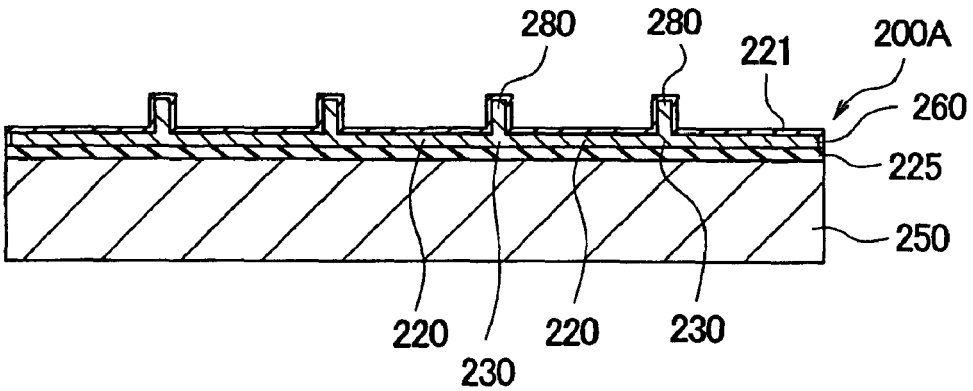

As shown in FIGS. 6D and 7D, the SOI substrate is subjected to, for example, dry thermal oxidation. Since the micromirrors 220, axis portions 230, and supports 280 are formed of silicon, on their surfaces is formed the insulating layer 221 as a thermal silicon oxide layer. The thickness of the insulating layer 221 is, for example, from 0.1 μm to 0.12 μm. It should be noted that in place of dry thermal oxidation, the insulating layer 221 maybe formed by the CVD method. As an insulating layer formed by this method may be cited, for example, silicon oxide using TEOS and silicon Nitride layer.

By means of the above, the second substrate 200A to form the mirror substrate 200 is completed. The surface of the second substrate 200A on which the supports 280 are formed is the surface for bonding to the electrode substrate (first substrate) 100.

By means of this, the micromirrors 220, axis portions 230, and supports 280 are made less liable to damage. In other words, since the thickness of the silicon monocrystalline layer 260 is extremely small, for example, 2 μm to 4 μm, if the silicon substrate 250 were not present, the micromirrors 220 and so on would easily be damaged. Since the second substrate 200A is constructed with the silicon monocrystalline layer 260 and the silicon substrate 250 laminated, breakage and suchlike damage to the micromirrors 220 and so on is less likely to occur.

Next, the first substrate (electrode substrate) 100 and second substrate 200A are bonded. The first and second substrates 100 and 200A may be bonded with an adhesive 150 interposed. FIG. 8 is a sectional view in the same orientation as the section take along the line VI—VI of FIG. 2. FIGS. 9A to 10D show the steps in the process from the bonding of the first and second substrates 100 and 200A. FIGS. 9A to 9D are sectional views in the same orientation as the section taken along the line VI—VI of FIG. 2. FIGS. 10A to 10D are sectional views in the same orientation as the section taken along the line VII—VII of FIG. 2.

The adhesive 150 may be provided on either of the first substrate (electrode substrate) 100 and the second substrate 200A, or may be provided on both of these. The adhesive 150 is provided at least in the portion of the bonding surface of the first substrate (electrode substrate) 100 and the bonding surface of the second substrate 200A that forms a bonding portion. For example, when the adhesive 150 is provided on the first substrate (electrode substrate) 100, it is provided in a region of the first substrate (electrode substrate) 100 including the portion to which the supports 280 of the second substrate 200A are bonded. Alternatively, when the adhesive 150 is provided on the second substrate 200A, it is provided in a region including extremities 281 of the supports 280 on the second substrate 200A. Alternatively, the adhesive 150 may be provided over the whole of the bonding surface of the first substrate (electrode substrate) 100 or the second substrate 200A. By means of this, the task of providing the adhesive 150 is simple.

As shown in FIG. 8, the adhesive 150 may be provided on the bonding surface of the first substrate (electrode substrate) 100. By means of this, since projecting supports are not formed on the first substrate (electrode substrate) 100, the adhesive 150 can be evenly provided on the surface of the first substrate (electrode substrate) 100. That is to say, even if the adhesive 150 is provided on substantially the whole of the bonding surface of the first substrate (electrode substrate) 100, it does not cause there to be any relief variation in the surface of the first substrate (electrode substrate) 100. Therefore, without obstructing the driving of the micromirrors 220 to tilt, and moreover without requiring precise positioning accuracy in the application of the adhesive 150, the adhesive 150 can be interposed between the first and second substrates 100 and 200A. It should be noted that the adhesive 150 may be provided not only in the recessed region 110 of the first substrate (electrode substrate) 100, but to extend to reach the side wall 120 positioned around the four sides thereof.

Figure 9A:
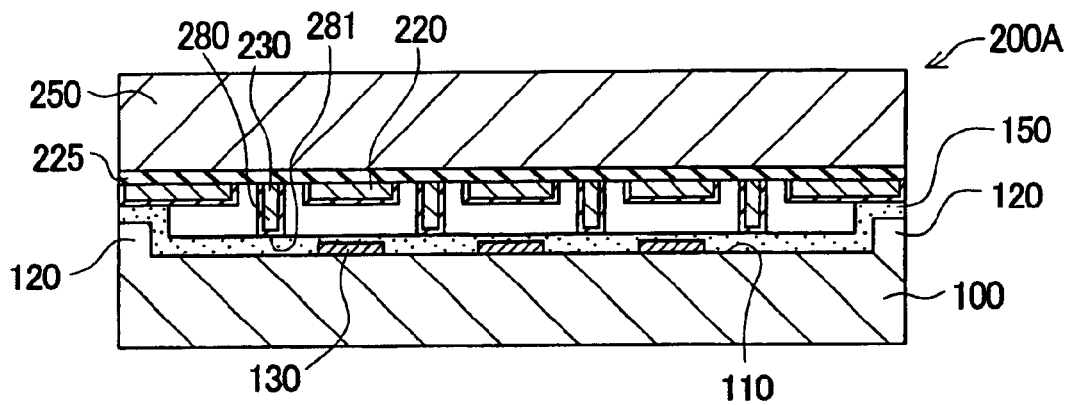
FIGS. 9A to 9D show the method of manufacturing a light modulator according to the first embodiment of the present invention.
Figure 10A:
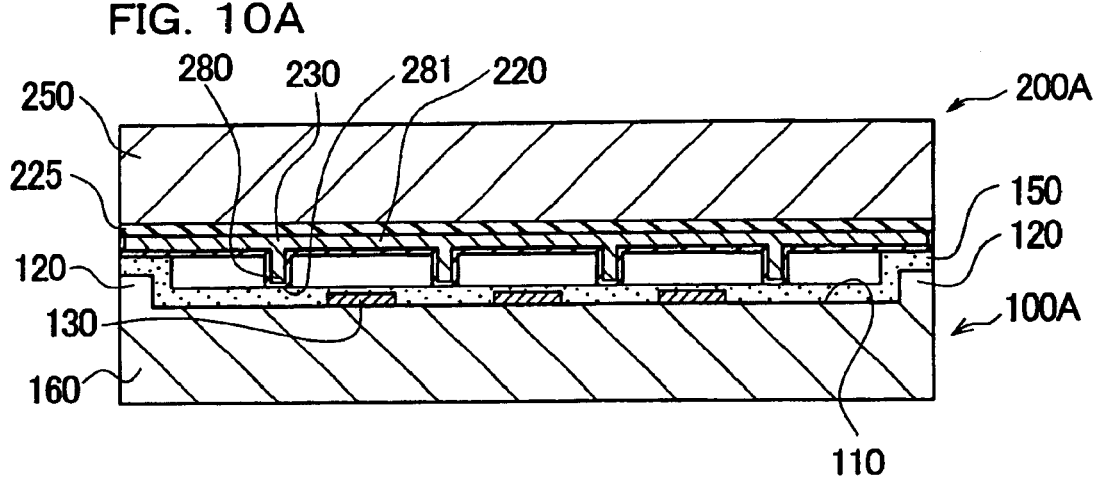
FIGS. 10A to 10D show the method of manufacturing a light modulator according to the first embodiment of the present invention.

The adhesive 150 may be provided on the bonding surface of the first substrate (electrode substrate) 100 by the spin coating method. That is to say, the adhesive 150 in paste form is dropped onto the first substrate (electrode substrate) 100, after which the first substrate (electrode substrate) 100 is rotated at high speed to spread the adhesive 150 uniformly over the surface. Then as shown in FIGS. 9A and 10A, the first substrate (electrode substrate) 100 and second substrate 200A are overlaid with the adhesive 150 interposed, and to cure the adhesive 150 energy is applied. For example, the adhesive 150 may be cured by heating.

As the material of the adhesive 150 may be used benzocyclobutene. When the spin coating method is applied, after dropping on the benzocyclobutene, the first substrate (electrode substrate) 100 may be rotated at approximately 5000 rpm for approximately 30 seconds, to effect uniform application. In the subsequent curing process, the first and second substrates 100 and 200A are both heated to approximately 250° C. for approximately 1 hour, so that they are bonded. By means of this, since the temperature to which the first and second substrates 100 and 200A are heated is lower than the temperature of heating in for example anodic bonding, the thermal stress to which the first and second substrates 100 and 200A are subject can be reduced. In particular, even if a silicon substrate on which a semiconductor element is formed is used as the first substrate (electrode substrate) 100, damage to the semiconductor element due to the application of heat in the bonding process can be prevented.

As the material of the adhesive 150 may be used, for example, an applied silicon oxide film (SOG: Spin On Glass), or polyimide resin, or the like. The adhesive 150 used may be in paste form at room temperature, or may be in film form.

By means of this, the first substrate (electrode substrate) 100 and second substrate (substrate for forming the mirror substrate 200) 200A are bonded with the adhesive 150 interposed. Even if for the sake of argument the substrates are heated, this heating is only to the temperature required to produce the adhesive force of the adhesive 150, as a result of which the thermal stress to which the substrates are subjected can be reduced. Therefore, it is possible to manufacture a light modulator of excellent durability. Since the adhesive 150 is merely provided, with a simple process the substrates can be bonded.

After forming the second substrate 200A to have the micromirrors 220 as described above before bonding the second substrate 200A to the first substrate (electrode substrate) 100, waste of the first substrate (electrode substrate) 100 can be prevented. That is to say, if for the sake of argument any of the micromirrors 220, axis portions 230, or supports 280 is defective, only the second substrate 200A is required to be discarded. Therefore, costs can be reduced. Alternatively, as described in the embodiment described below, after bonding the first and second substrates 100 and 200A, the micromirrors 220 and axis portions 230 may be formed from the first layer 260 of the second substrate 200A.

As a variant example of the method of bonding the first and second substrates 100 and 200A, the two may be bonded by anode bonding. In this case, the first substrate (electrode substrate) 100 may be a glass substrate. A glass substrate may be formed, for example, of a glass including an alkali metal such as sodium (Na). As such a glass substrate can be used sodium borosilicate glass, for example Pyrex glass (trade name) made by Corning. In particular, for the purpose of heating the glass substrate in anode bonding, considering the need to have a coefficient of thermal expansion substantially equal to that of silicon, Corning #7740 (trade name) may be used.

Now the method of bonding by anode bonding is described. First, the first substrate (electrode substrate) 100 is connected to the negative terminal of a direct current supply, and the second substrate 200A is connected to the positive terminal of the direct current supply. Then while heating the first substrate (electrode substrate) 100 and second substrate 200A, a voltage is applied to the first substrate (electrode substrate) 100 and second substrate 200A. By means of this heating, $Na^+$ ions within the first substrate (electrode substrate) 100 become more mobile. By means of this $Na^+$ ion mobility, the bonding surface of the first substrate (electrode substrate) 100 is given a negative electrical charge, and the bonding surface of the second substrate 200A is given a positive electrical charge. As a result, the first substrate (electrode substrate) 100 and second substrate 200A are firmly bonded. It should be noted that other than anode bonding, for example, low fusion point glass may be used to fix the second substrate 200A to the first substrate (electrode substrate) 100.

Figure 9B:
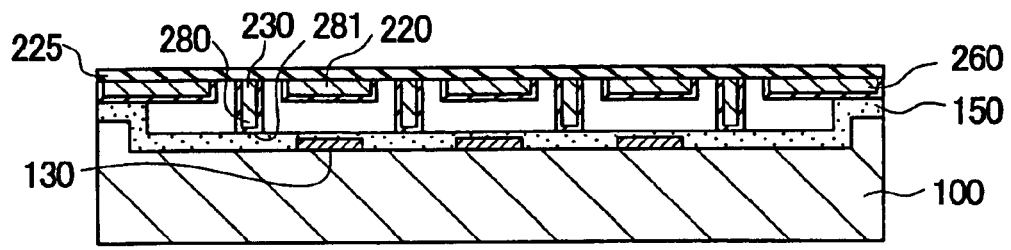
Figure 10B:
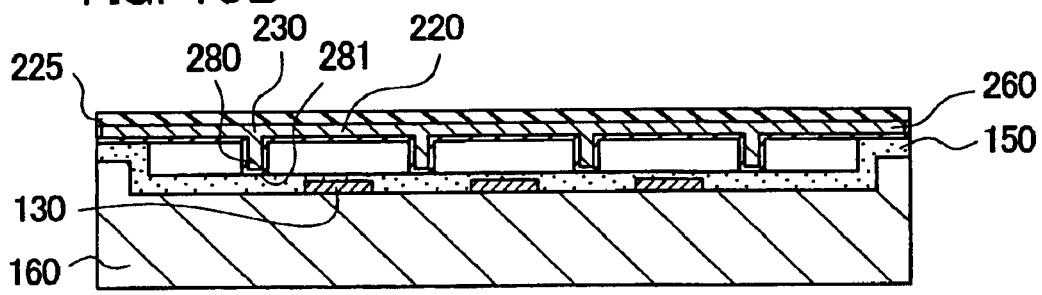

As shown in FIGS. 9B and 10B, the silicon substrate (second layer) 250 is removed. For this removal, for example, wet etching, dry etching, or a combination of these with grinding is used. In any case, when removing the silicon substrate 250, the silicon oxide layer 225 acts as a stopping layer. Therefore, damage to the silicon monocrystalline layer 260 constituting the micromirrors 220, axis portions 230, and supports 280 can be prevented. As a result, the yield of the light modulator can be increased.

First, the case of wet etching is described. The first and second substrates 100 and 200A in the bonded state are immersed in, for example, an aqueous solution of KOH of concentration 1 to 40 percent by weight. The concentration of the aqueous solution of KOH may be around 10 percent by weight. The reaction equation for this etching is as follows.

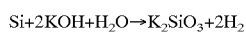
$$Si+2KOH+H_2O \rightarrow K_2SiO_3+2H_2$$

The etching rate of the silicon substrate 250 by the aqueous solution of KOH is considerably higher than the etching rate of the silicon oxide layer 225, and as a result the silicon oxide layer 225 functions as a stopping layer for the etching.

Since the silicon oxide layer 225 is present, ingress of the aqueous solution of KOH into the space in which the drive electrodes 130 are disposed can be prevented. If the silicon oxide layer 225 were not present, the drive electrodes 130 would be damaged by the aqueous solution of KOH. It should be noted that as the etchant used in this process, other than an aqueous solution of KOH, an aqueous solution of TMAH (tetramethyl ammonium hydroxide), an aqueous solution of EPD (ethylenediamine-pyrocatechol-diazine), or an aqueous solution of hydrazine, or the like. By means of wet etching, batch processing is possible, and therefore the productivity in respect of the light modulator can be improved.

Next, the case of dry etching is described. The first and second substrates 100 and 200A in the bonded state are loaded into a chamber. For example, $XeF_2$ at a pressure of 390 Pa is introduced into the chamber for 60 seconds. The reaction equation for this etching is as follows.

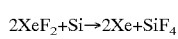
$$2XeF_2+Si \rightarrow 2Xe+SiF_4$$

With dry etching by $XeF_2$, the etching rate of the silicon substrate 250 is considerably higher than the etching rate of the silicon oxide layer 225, and as a result the silicon oxide layer 225 functions as a stopping layer for the etching. Since this etching does not use a plasma, the first and second substrates 100 and 200A are not susceptible to damage. It should be noted that in place of $XeF_2$, for example, $CF_4$ or $SF_6$ plasma etching can be used.

In the case of wet etching, if there are defects such as pinholes in the first substrate (electrode substrate) 100 or second substrate 200A, the etchant may enter the region in which the drive electrodes 130 and supports 280 are formed, and this may cause the drive electrodes 130 or supports 280 to be damaged. In the case of dry etching, since no etching liquid is used, these problems can be prevented.

With respect to grinding, this is grinding as normally used in the field of semiconductors, and description is omitted here.

Alternatively, a combination of any of wet etching, dry etching, and grinding can be used to remove the silicon substrate 250. For example, after removing a part of the silicon substrate 250 by grinding, the remaining part of the silicon substrate 250 may be removed by wet etching or dry etching. With grinding the rate of removing the silicon substrate 250 is faster than with etching, but with etching the silicon substrate 250 can be removed with higher precision than with grinding. Therefore, by using grinding to remove the majority of the silicon substrate 250 rapidly, the remainder of the silicon substrate 250 can then be removed at high precision by etching, without damaging the silicon monocrystalline layer 260.

Since the silicon substrate 250 is removed with the silicon oxide layer 225 as a stopping layer, increased surface roughening of the micromirror 220 can be prevented. Therefore, a light modulator equipped with a micromirror of high reflectivity can be fabricated.

Figure 9C:
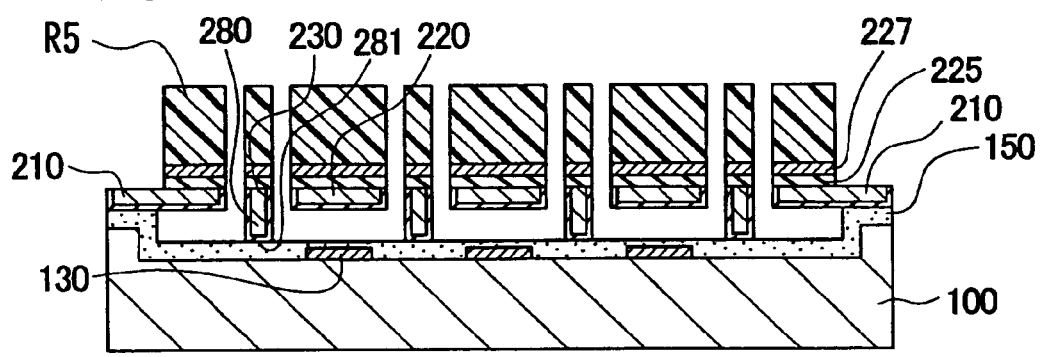
Figure 10C:
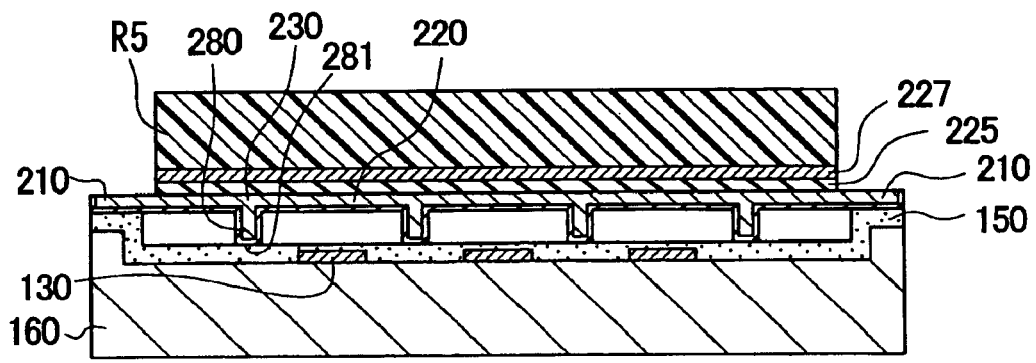

As shown in FIGS. 9C and 10C, the reflecting layer 227 of aluminum is formed on the silicon oxide layer 225, for example by sputtering. The thickness of the reflecting layer 227 is, for example, from 0.1 $\mu$m to 0.2 $\mu$m.

Next, a resist R5 is applied on the reflecting layer 227, and the resist R5 is patterned in a predetermined manner by means of photolithography. With the resist R5 as a mask, the reflecting layer 227 and silicon oxide layer 225 are subjected to, for example, anisotropic dry etching. By means of this, the reflecting layer 227 is patterned, and also the micromirrors 220 are separated from each other. Then the resist R5 is removed. In this way, the mirror substrate 200 is obtained.

Figure 9D:
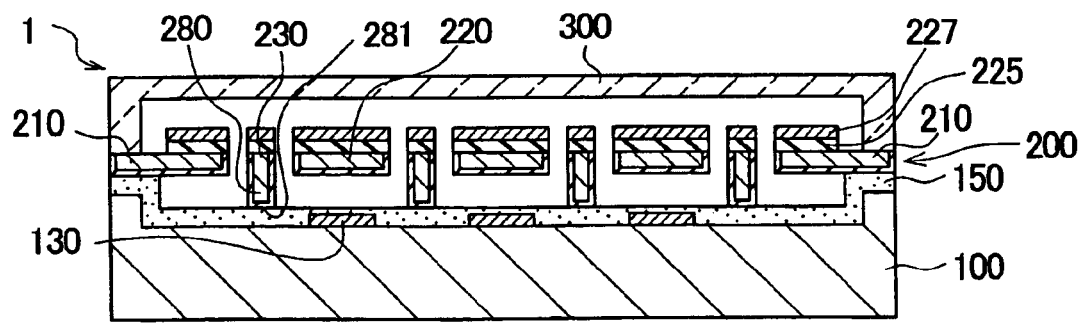
Figure 10D:
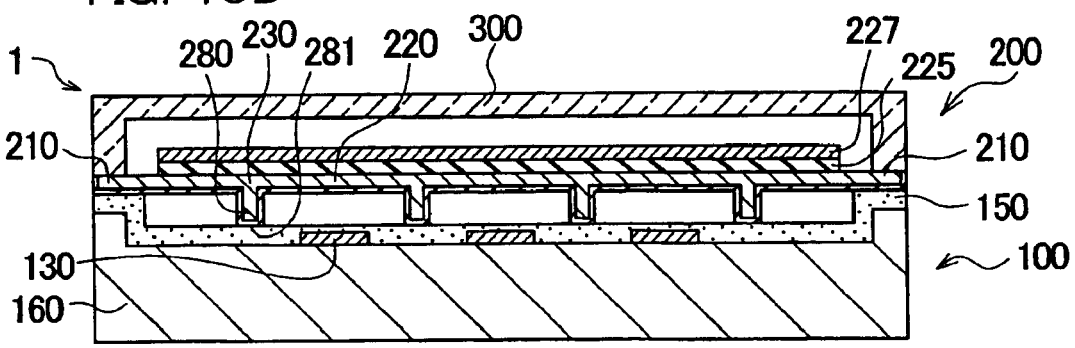

As shown in FIGS. 9D and 10D, by attaching the cover glass substrate 300 to the frame 210 of the mirror substrate 200, the light modulator 1 is completed. The cover glass substrate 300 may be attached to the mirror substrate 200 by adhesive (not shown in the drawings), for example, or may be attached by anode bonding.

When the surface of the micromirror 220 constitutes the reflecting layer, the formation of the reflecting layer 227 may be omitted. Since the silicon oxide layer 225 is transparent, it need not be removed, but on the other hand it may be removed depending on the characteristics required of the micromirror 220. In this case, in order to avoid damage to the drive electrodes 130 and so on by the etchant, for the removal of the silicon oxide layer 225 dry etching is preferable.

According to this embodiment, since the supports 280 and axis portions 230 are formed integrally, the mechanical strength of their boundary can be increased. The boundary is therefore less susceptible to breakage when the micromirror 220 is driven to tilt and twisted. Therefore, a light modulator of excellent durability can be fabricated.

2. Second Embodiment

FIGS. 11A to 14D show the light modulator and the method of manufacturing the light modulator according to a second embodiment of the present invention. In this embodiment, various of the aspects described in the first embodiment can also selectively be applied.

In this embodiment, after bonding the first and second substrates 100 and 200B, the micromirrors 220 and axis portions 230 are formed from the second substrate 200B.

2.1 Method of Manufacturing the Light Modulator

The method of manufacturing the light modulator in this embodiment includes forming a first substrate (electrode substrate) 100 and a second substrate 200B to form the mirror substrate 200, and bonding these. The first substrate 100 is as described in the first embodiment.

Figure 11A:
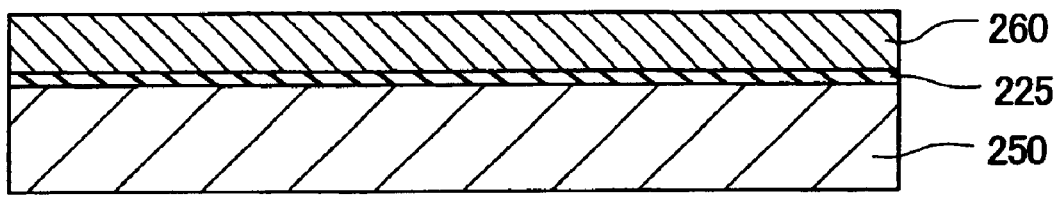
FIGS. 11A to 11C show a method of manufacturing a light modulator according to a second embodiment of the present invention.
Figure 11B:
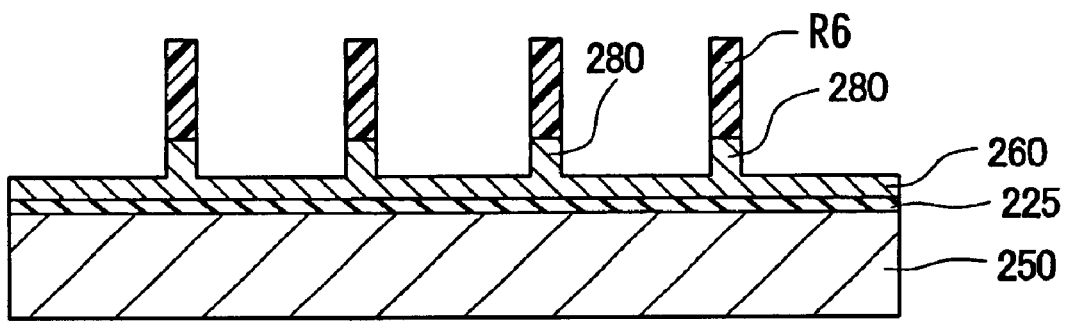
Figure 11C:
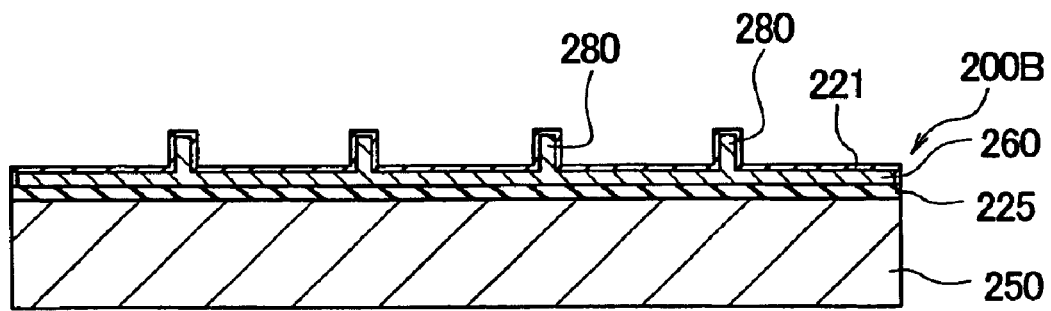

With reference to FIGS. 11A to 11C, the fabrication of the second substrate 200B is now described. It should be noted that FIGS. 11A to 11C are sectional views in the same orientation as the section taken along the line VI—VI of FIG. 2.

As shown in FIG. 11A, an SOI substrate has the silicon substrate 250, the silicon oxide layer 225, and the silicon monocrystalline layer 260 laminated in this sequence.

As shown in FIG. 11B, a resist R6 is applied on the silicon monocrystalline layer 260, and the resist R6 is patterned in a predetermined manner by means of photolithography. For example, using anisotropic dry etching, the upper part of the silicon monocrystalline layer 260 is patterned to form supports 280.

As shown in FIG. 1C, the SOI substrate is subjected to, for example, dry thermal oxidation. In this way, the surface of the silicon monocrystalline layer 260 (including the supports 280) has an insulating layer 221 formed by a thermal silicon oxide layer on the surface. By means of the above, the second substrate 200B is completed. The surface of the second substrate 200B on which the supports 280 are formed is the bonding surface with the first substrate 100.

Figure 12:
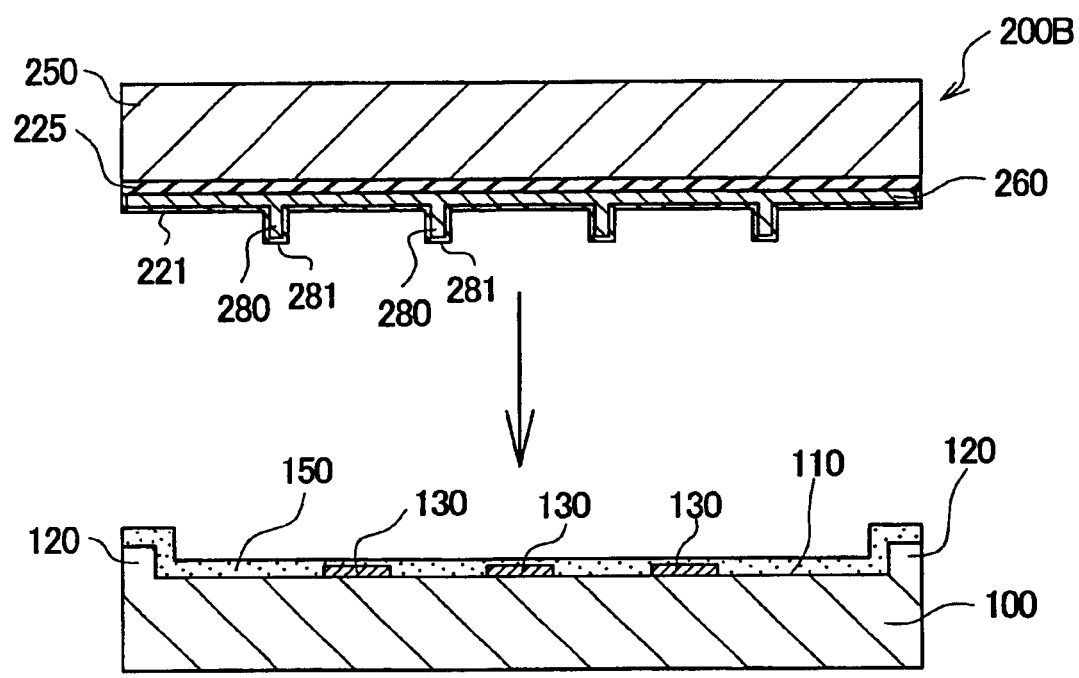
FIG. 12 shows the method of manufacturing a light modulator according to the second embodiment of the present invention.

Next, as shown in FIG. 12, the first substrate (electrode substrate) 100 and second substrate 200B are bonded. The first and second substrates 100 and 200B may be bonded by the interposition of the adhesive 150. FIG. 12 is a sectional view in the same orientation as the section taken along the line VI—VI of FIG. 2. FIGS. 13A to 14D illustrate the step of bonding the first and second substrates 100 and 200B and the subsequent process. FIGS. 13A to 13D are sectional views in the same orientation as the section taken along the line VI—VI of FIG. 2. FIGS. 14A to 14D are sectional views in the same orientation as the section taken along the line VII—VII of FIG. 2.

As shown in FIG. 12, the adhesive 150 may be provided on the bonding surface of the first substrate 100. By this means, the adhesive 150 can be provided uniformly on the surface of the first substrate 100. Other examples of the method of bonding by the adhesive 150 are as described in the first embodiment. Alternatively, the first and second substrates 100 and 200B may be bonded by, for example, anode bonding or bonding by low fusion point glass.

Figure 13A:
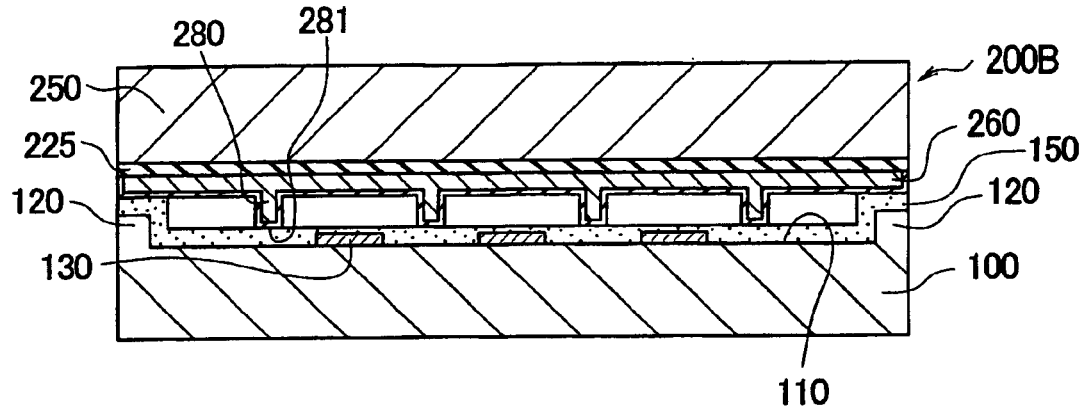
FIGS. 13A to 13D show the method of manufacturing a light modulator according to the second embodiment of the present invention.
Figure 14A:
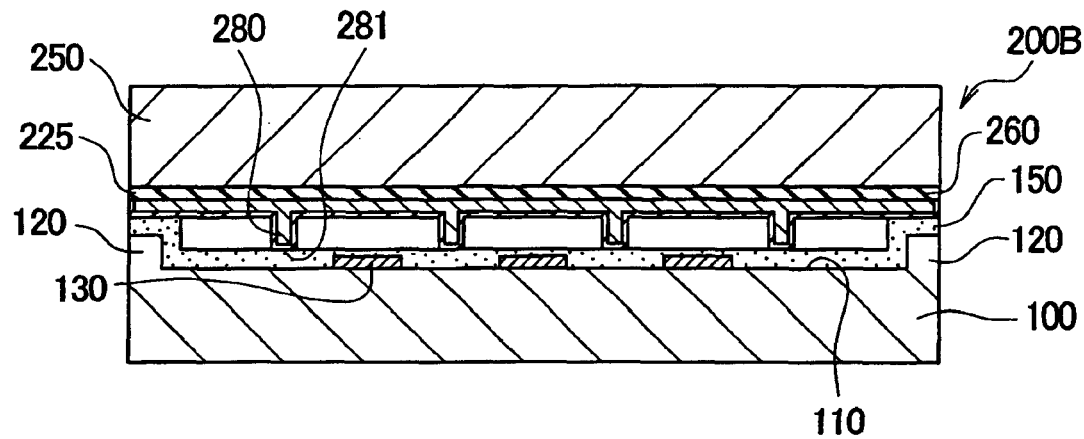
FIGS. 14A to 14D show the method of manufacturing a light modulator according to the second embodiment of the present invention.

In this way, As shown in FIGS. 13A and 14A, the second substrate 200B is bonded to the first substrate 100 so that the silicon monocrystalline layer (first layer) 260 and drive electrodes 130 are opposed. From the silicon monocrystalline layer (first layer) 260, the supports 280 are formed. In this embodiment, after bonding the first and second substrates 100 and 200B, the micromirrors 220 and axis portions 230 are formed from the second substrate 200B.

Figure 13B:
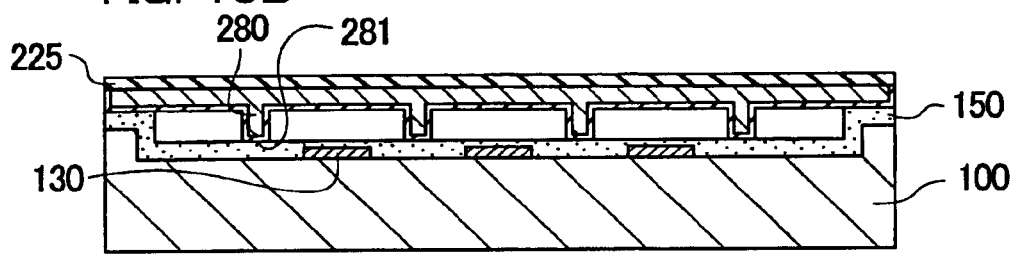
Figure 14B:
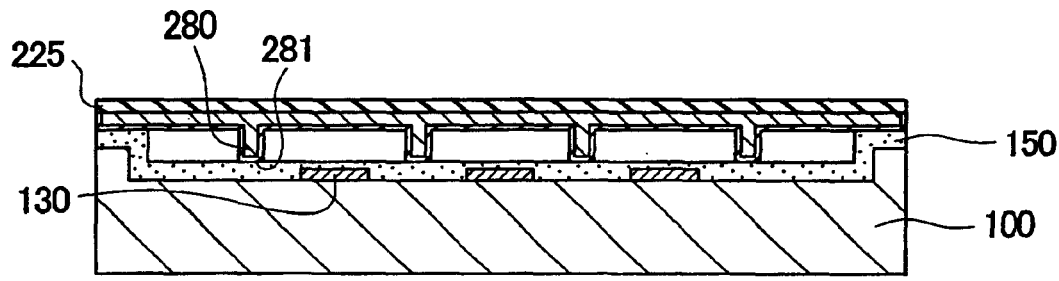

As shown in FIGS. 13B and 14B, the silicon substrate (second layer) 250 is removed. When removing the silicon substrate 250, since the silicon oxide layer 225 acts as a stopping layer, damage to the silicon monocrystalline layer 260 on which the micromirrors are formed can be prevented.

Figure 13C:
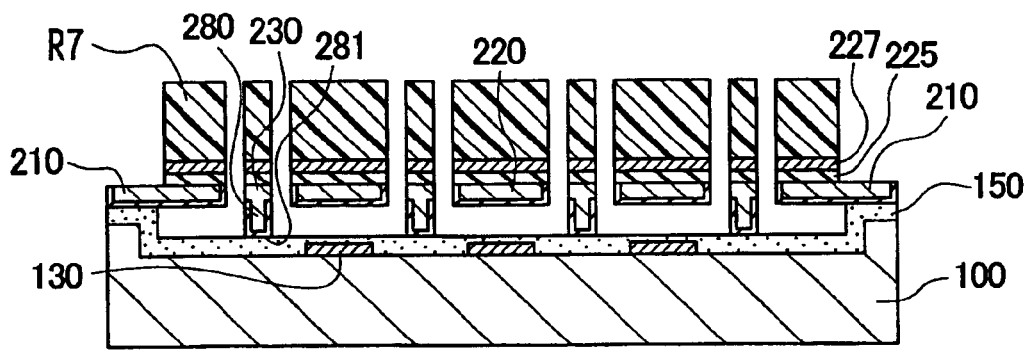
Figure 14C:
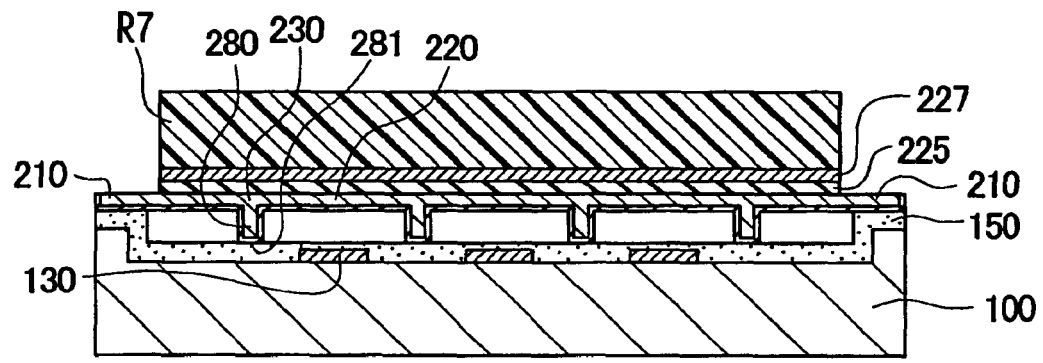

As shown in FIGS. 13C and 14C, the reflecting layer 227 of aluminum is formed on the silicon oxide layer 225, for example by sputtering.

Next, a resist R7 is applied on the reflecting layer 227, and the resist R7 is patterned in a predetermined manner by means of photolithography. With the resist R7 as a mask, the reflecting layer 227, silicon oxide layer 225 and silicon monocrystalline layer 260 are subjected to, for example, an isotropic dry etching. By means of this, the micromirrors 220 and axis portions 230 are formed. The micromirrors 220, axis portions 230 and supports 280 are formed integrally. A micromirror 220 has on its surface a reflecting layer 227, with the silicon oxide layer 225 interposed. Then the resist R7 is removed. In this way, the mirror substrate 200 is obtained.

Figure 13D:
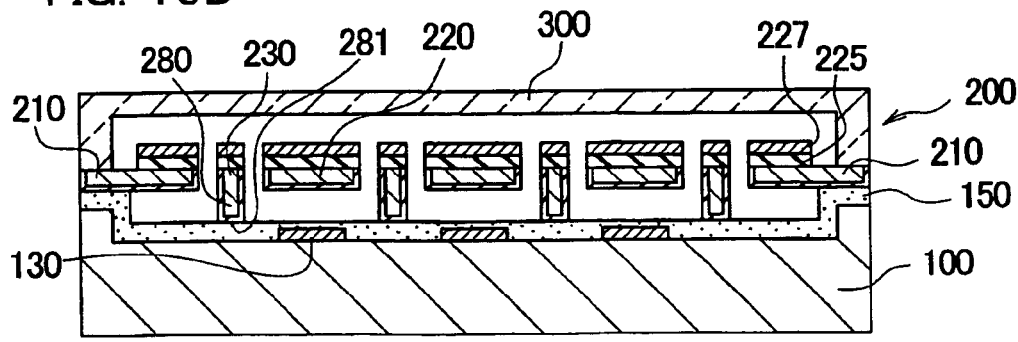
Figure 14D:
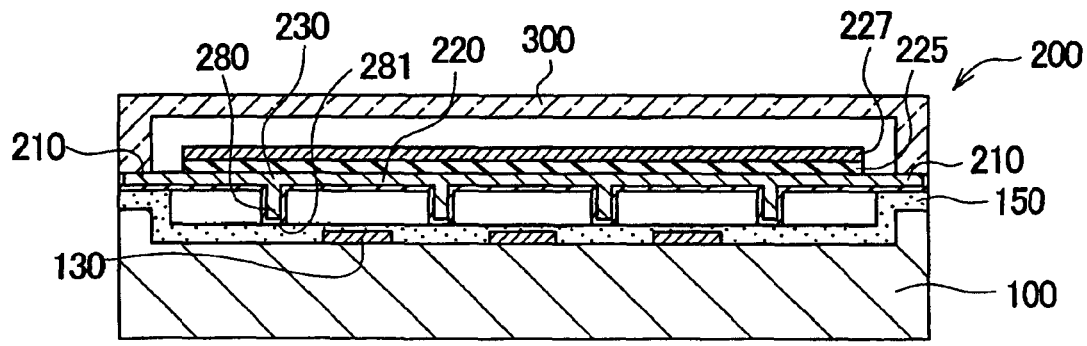

As shown in FIGS. 13D and 14D, by attaching the cover glass substrate 300 to the frame 210 of the mirror substrate 200, the light modulator is completed.

In this embodiment also, since the supports 280 and axis portions 230 are formed integrally, the mechanical strength of their boundary can be increased. The boundary is therefore less susceptible to breakage when the micromirror 220 is driven to tilt and twisted. Therefore, a light modulator of excellent durability can be fabricated.

What is claimed is:

1. A method of manufacturing a light modulator in which micromirrors are tilted by an electrostatic force generated by an electrical potential difference between drive electrodes and the micromirrors, the method comprising:

providing a first layer on a second layer;

integrally forming from the first layer provided on the second layer the micromirrors, support sections disposed at fulcrum points for tilting the micromirrors and axis portions which form axes for tilting the micromirrors; and removing the second layer from the first layer.

2. The method of manufacturing a light modulator as defined in claim 1, further comprising bonding a first substrate including the drive electrodes to a second substrate which includes: the first layer the second layer and a third layer provided between the first and second layers and acting as a stopping layer when the second layer is removed.

3. The method of manufacturing a light modulator as defined in claim 2, wherein end portions of the support sections of the second substrate are bonded to the first substrate, after the formation of the support sections.

4. The method of manufacturing a light modulator as defined in claim 3, wherein the end portions of the support sections of the second substrate are bonded to the first substrate with an adhesive interposed.

5. The method of manufacturing a light modulator as defined in claim 4, wherein the adhesive is provided on the first substrate.

6. The method of manufacturing a light modulator as defined in claim 3, wherein the second layer is removed using the third layer as a stopping layer after the bonding of the first and second substrates.

7. The method of manufacturing a light modulator as defined in claim 4, wherein the second layer is removed using the third layer as a stopping layer after the bonding of the first and second substrates.

8. The method of manufacturing a light modulator as defined in claim 5, wherein the second layer is removed using the third layer as a stopping layer after the bonding of the first and second substrates.

9. The method of manufacturing a light modulator as defined in claim 6, wherein the micromirrors and the support sections are formed after the removal of the second layer.

10. The method of manufacturing a light modulator as defined in claim 3, wherein the micromirrors and the support sections are formed before the bonding of the first and second substrates.

11. The method of manufacturing a light modulator as defined in claim 4, wherein the micromirrors and the support sections are formed before the bonding of the first and second substrates.

12. The method of manufacturing a light modulator as defined in claim 5, wherein the micromirrors and the support sections are formed before the bonding of the first and second substrates.

13. The method of manufacturing a light modulator as defined in claim 6, wherein the micromirrors and the support sections are formed before the bonding of the first and second substrates.

14. The method of manufacturing a light modulator as defined in claim 7, wherein the micromirrors and the support sections are formed before the bonding of the first and second substrates.

15. The method of manufacturing a light modulator as defined in claim 8, wherein the micromirrors and the support sections are formed before the bonding of the first and second substrates.

* * * * *